(12) United States Patent
Koski

(10) Patent No.: US 8,462,112 B2
(45) Date of Patent: Jun. 11, 2013

(54) RESPONSIVENESS CONTROL SYSTEM FOR POINTING DEVICE MOVEMENT WITH RESPECT TO A GRAPHICAL USER INTERFACE

(75) Inventor: David A. Koski, San Jose, CA (US)

(73) Assignee: Apple Inc., Cupertino, CA (US)

( * ) Notice: Subject to any disclaimer, the term of this patent is extended or adjusted under 35 U.S.C. 154(b) by 805 days.

(21) Appl. No.: 11/776,988

(22) Filed: Jul. 12, 2007

(65) Prior Publication Data

US 2009/0015550 A1 Jan. 15, 2009

(51) Int. Cl.
*G06F 3/033* (2006.01)
*G09G 5/00* (2006.01)

(52) U.S. Cl.
USPC .......................................... 345/159; 345/156

(58) Field of Classification Search
USPC .................................. 345/156–179
See application file for complete search history.

(56) References Cited

U.S. PATENT DOCUMENTS

| | | | |
|---|---|---|---|
| 5,508,717 A * | 4/1996 | Miller | 345/157 |
| 5,786,805 A | 7/1998 | Barry | |
| 5,808,604 A | 9/1998 | Robin | |
| 5,889,670 A | 3/1999 | Schuler et al. | |
| 6,028,594 A | 2/2000 | Inoue | |
| 6,031,351 A | 2/2000 | Kawaguchi | |
| 6,147,677 A * | 11/2000 | Escobosa et al. | 345/156 |
| 6,195,592 B1 | 2/2001 | Schuler et al. | |
| 6,281,879 B1 | 8/2001 | Graham | |
| 6,466,199 B2 | 10/2002 | Takase et al. | |
| 6,583,781 B1 | 6/2003 | Joshi et al. | |
| 6,642,947 B2 | 11/2003 | Feierbach | |
| 6,747,680 B1 | 6/2004 | Igarashi et al. | |
| 6,876,891 B1 * | 4/2005 | Schuler et al. | 345/156 |
| 7,319,457 B2 | 1/2008 | Lin et al. | |
| 2001/0002126 A1 * | 5/2001 | Rosenberg et al. | 345/156 |
| 2003/0132909 A1 | 7/2003 | Haynes | |
| 2003/0201973 A1 | 10/2003 | Gould et al. | |
| 2004/0189714 A1 | 9/2004 | Fox et al. | |
| 2006/0033721 A1 | 2/2006 | Woolley et al. | |
| 2007/0176900 A1 | 8/2007 | Nagar | |
| 2009/0015557 A1 | 1/2009 | Koski | |
| 2009/0015568 A1 | 1/2009 | Koski | |

FOREIGN PATENT DOCUMENTS

JP 06186059 7/1994

OTHER PUBLICATIONS

Office Action for U.S. Appl. No. 11/776,971, mailed Jun. 8, 2010.
Office Action for U.S. Appl. No. 11/777,004, mailed Jul. 21, 2010.

(Continued)

*Primary Examiner* — Waseem Moorad

(57) ABSTRACT

Improved techniques that enable control of responsiveness to user movement of a pointing device with respect to a graphical user interface are disclosed. According to one embodiment, by controlling responsiveness, a friction effect can be imposed at predetermined regions of the graphical user interface. According to another embodiment, by controlling responsiveness, a gravitational effect can be imposed at predetermined regions of the graphical user interface. According to still another embodiment, by controlling responsiveness, frictional and gravitational effects can be imposed at predetermined regions of the graphical user interface. The responsiveness control, e.g., frictional effect and/or gravitational effect, can be used to enhance user interaction with the graphical user interface. For example, user controls, such as buttons, boxes, borders, boundaries, etc., can be more easily navigated and selected by users when the regions associated with such user controls are provided with modified responsiveness control (e.g., frictional effect and/or gravitational effect).

22 Claims, 17 Drawing Sheets

OTHER PUBLICATIONS

Office Action for U.S. Appl. No. 11/776,971, mailed Nov. 29, 2010.
Office Action for U.S. Appl. No. 11/777,004, mailed Dec. 22, 2010.
Final Office Action for U.S. Appl. No. 11/777,004, mailed Dec. 22, 2010.
Advisory Action for U.S. Appl. No. 11/777,004, mailed Apr. 8, 2011.
Office Action for U.S. Appl. No. 11/776,971, mailed Apr. 28, 2011.
Office Action for U.S. Appl. No. 11/776,971, mailed Sep. 12, 2011.
Office Action for U.S. Appl. No. 11/777,004, mailed Dec. 7, 2011.
Final Office Action for U.S. Appl. No. 11/776,971, mailed Mar. 15, 2012.
Final Office Action for U.S. Appl. No. 11/777,004, mailed Mar. 22, 2012.

* cited by examiner

RESPONSIVENESS CONTROL SYSTEM FOR POINTING DEVICE MOVEMENT WITH RESPECT TO A GRAPHICAL USER INTERFACE

CROSS-REFERENCE TO RELATED APPLICATIONS

This application is related to (i) U.S. application Ser. No. 11/776,971, filed concurrently, and entitled "RESPONSIVENESS CONTROL METHOD FOR POINTING DEVICE MOVEMENT WITH RESPECT TO A GRAPHICAL USER INTERFACE," which is hereby incorporated herein by reference; and (ii) U.S. application Ser. No. 11/777,004, filed concurrently, and entitled "METHOD AND APPARATUS FOR IMPLEMENTING SLIDER DETENTS," which is hereby incorporated herein by reference.

BACKGROUND OF THE INVENTION

1. Field of the Invention

The present invention relates to graphical user interfaces and, more particularly, user positional movement with respect to graphical user interfaces.

2. Description of the Related Art

In recent years, display screens (e.g., monitors) used by personal computers have generally gotten larger in size and in pixel density. These display screens are used to present graphical user interfaces. The graphical user interfaces support various user interface controls to facilitate user interaction with the graphical user interfaces. Typically, user interface controls are selected using a mouse or other pointing device. Using the mouse or other pointing device, a user maneuvers a cursor over a particular user interface control and then activates the user interface control by clicking a button associated with the mouse or other pointing device. Unfortunately, however, as display screens and pixel densities get larger, the user interface controls that a user needs to interact with get smaller as a percentage of the display screen. As a result, it is becoming increasingly more difficult to select user interface controls.

Conventionally, mouse positioning on a display screen of a personal computer system uses a relative positioning approach. FIG. 1 illustrates a conventional mouse positioning system 100. The conventional mouse positioning system 100 knows a current position for the mouse. The mouse positioning system 100 also receives mouse position change information, such as ΔX, ΔY, which is associated with relative movement of the mouse with respect to the current position. Using the current position and the position change information, the mouse positioning system 100 can determine a next position for the mouse. The mouse position is displayed on the display screen as a mouse indicator (cursor). Conventionally, in some embodiments, mouse positioning can further make use of acceleration so that greater mouse indicator movement on the display screen can be achieved based on the speed of the mouse movement.

SUMMARY OF THE INVENTION

The invention pertains to techniques that enable control of responsiveness to user movement of a pointing device with respect to a graphical user interface. According to one embodiment, by controlling responsiveness, the invention can impose a friction effect at predetermined regions of the graphical user interface. According to another embodiment, by controlling responsiveness, the invention can impose a gravitational effect at predetermined regions of the graphical user interface. According to still another embodiment, by controlling responsiveness, the invention can impose a frictional and gravitational effect at predetermined regions of the graphical user interface. The responsiveness control, e.g., frictional effect and/or gravitational effect, can be used to enhance user interaction with the graphical user interface. For example, user controls, such as buttons, boxes, borders, boundaries, etc., can be more easily navigated and selected by users when the regions associated with such user controls are provided with modified responsiveness control (e.g., frictional effect and/or gravitational effect).

The invention can be implemented in numerous ways, including as a method, system, device, apparatus (including graphical user interface), or computer readable medium. Several embodiments of the invention are discussed below.

As a computing system, one embodiment of the invention includes at least: a display screen for presenting a graphical user interface, the graphical user interface having at least one user control, a pointing device for a user to provide user input so as to manipulate a position indicator being display on the display screen, and a positioning system. The positioning system can be configured to receive the user input via the pointing device, determine a responsiveness effect to be applied in moving the position indicator in view of the user input, determine a next position for the position indicator based on the user input and the responsiveness effect, and cause the position indicator to be displayed at the next position.

As a computing apparatus supporting a display screen for visual output to a user and a pointing device for visual input by the user, one embodiment of the invention includes at least a positioning system configured to receive the user input via the pointing device and to cause a position indicator to be displayed at a next position for the pointing device in accordance with the user input. The positioning system includes at least means for determining a responsiveness effect to be applied in moving the position indicator in view of the user input; and means for determining the next position for the position indicator based on the user input and the responsiveness effect.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to techniques that enable control of responsiveness to user movement of a pointing device with respect to a graphical user interface. According to one embodiment, by controlling responsiveness, the invention can impose a friction effect at predetermined regions of the graphical user interface. According to another embodiment, by controlling responsiveness, the invention can impose a gravitational effect at predetermined regions of the graphical user interface. According to still another embodiment, by controlling responsiveness, the invention can impose a frictional and gravitational effect at predetermined regions of the graphical user interface. The responsiveness control, e.g., frictional effect and/or gravitational effect, can be used to enhance user interaction with the graphical user interface. For example, user controls, such as buttons, boxes, borders, boundaries, etc., can be more easily navigated and selected by users when the regions associated with such user controls are provided with modified responsiveness control (e.g., frictional effect and/or gravitational effect).

Embodiments of the invention are discussed below with reference to FIGS. 2-15. However, those skilled in the art will readily appreciate that the detailed description given herein with respect to these figures is for explanatory purposes as the invention extends beyond these limited embodiments.

Figure 2:
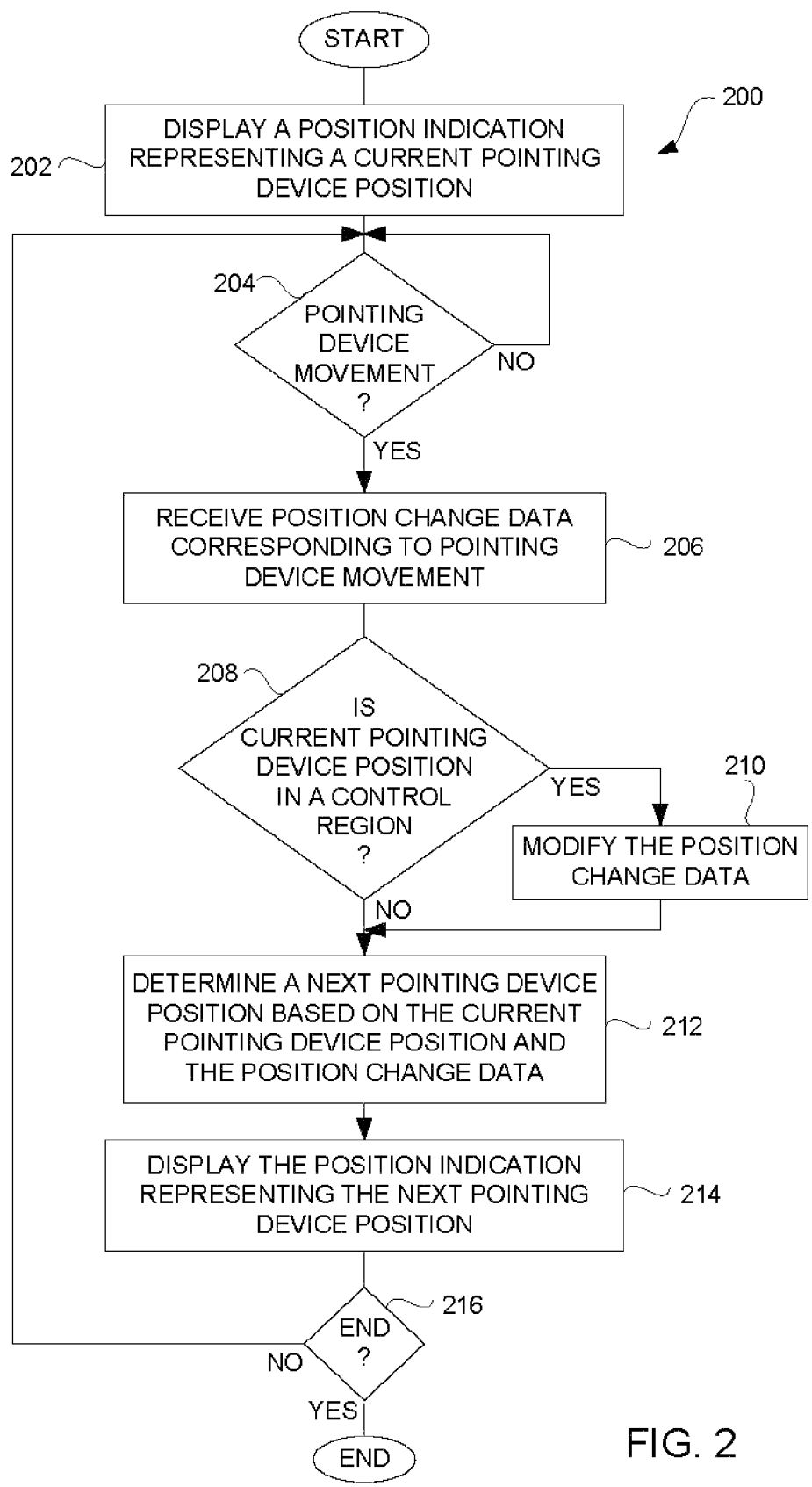
FIG. 2 is a flow diagram of a responsiveness control process according to one embodiment of the invention.

FIG. 2 is a flow diagram of a responsiveness control process 200 according to embodiment of the invention. The responsive control process concerns control of the responsiveness of a pointing device with regard to user movement. More particularly, the responsiveness control process concerns the responsiveness of a visual position indication representing the position of the pointing device. Typically, the responsiveness control process 200 would be performed by a computing device having a display screen that presents a graphical user interface and permits a user to interact with the graphical user interface using the pointing device.

The responsiveness control process 200 can begin by display 202 of a position indication on the display screen. The position indication can represent a current pointing device position. A decision 204 can then determine whether there is pointing device movement. Here, a user can manipulate the pointing device to cause pointing device movement. For example, the pointing device can pertain to a mouse or a track ball. When the user causes movement of the mouse or the track ball, pointing device movement is recognized and the associated position indication being displayed can be correspondingly moved. When the decision 204 determines that there has not been pointing device movement, the responsiveness control process 200 can await pointing device movement.

Once the decision 204 determines that pointing device movement has been recognized, the responsiveness control process 200 can continue. In this regard, position change data corresponding to the pointing device movement can be received 206. In one embodiment, the position change data can be relative position change data based on the current pointing device position. As an example, the position change data can include a change in an X coordinate and a change in a Y coordinate. Next, a decision 208 determines whether the current pointing device position is in a control region. When the decision 208 determines that the current pointing device position is within a control region, the position change data can be modified 210. By modifying 210 the position change data, the responsiveness of the pointing device to user movement is able to be altered in the control region. Consequently, when the current pointing device position is within a control region, the behavior of the pointing device is able to be altered to assist the user in interacting with the graphical user interface with respect to the particular control region.

Following the block 210 or directly following the decision 208 when the current pointing device position is not in a control region, a next pointing device position is determined 212 based on the current pointing device position and position change data. Since the position change data is typically relative to its current position, the position change data can often be added to the current pointing device position to determine the next pointing device position. The position indication representing the next pointing device position can then be displayed 214.

Thereafter, a decision 216 can determine whether the responsiveness control process 200 should end. When the decision 216 determines that the responsiveness control process 200 should not end, then the responsiveness control process 200 returns to repeat the decision 204 and subsequent blocks so that additional pointing device movement can be received and responded to in a similar manner. Alternatively, when the decision 216 determines that the responsiveness control process 200 should end, then the responsiveness control process 200 can end.

FIGS. 3-7D pertain to embodiments of the invention that provide a frictional effect to pointing device (e.g., mouse) movement.

Figure 3:
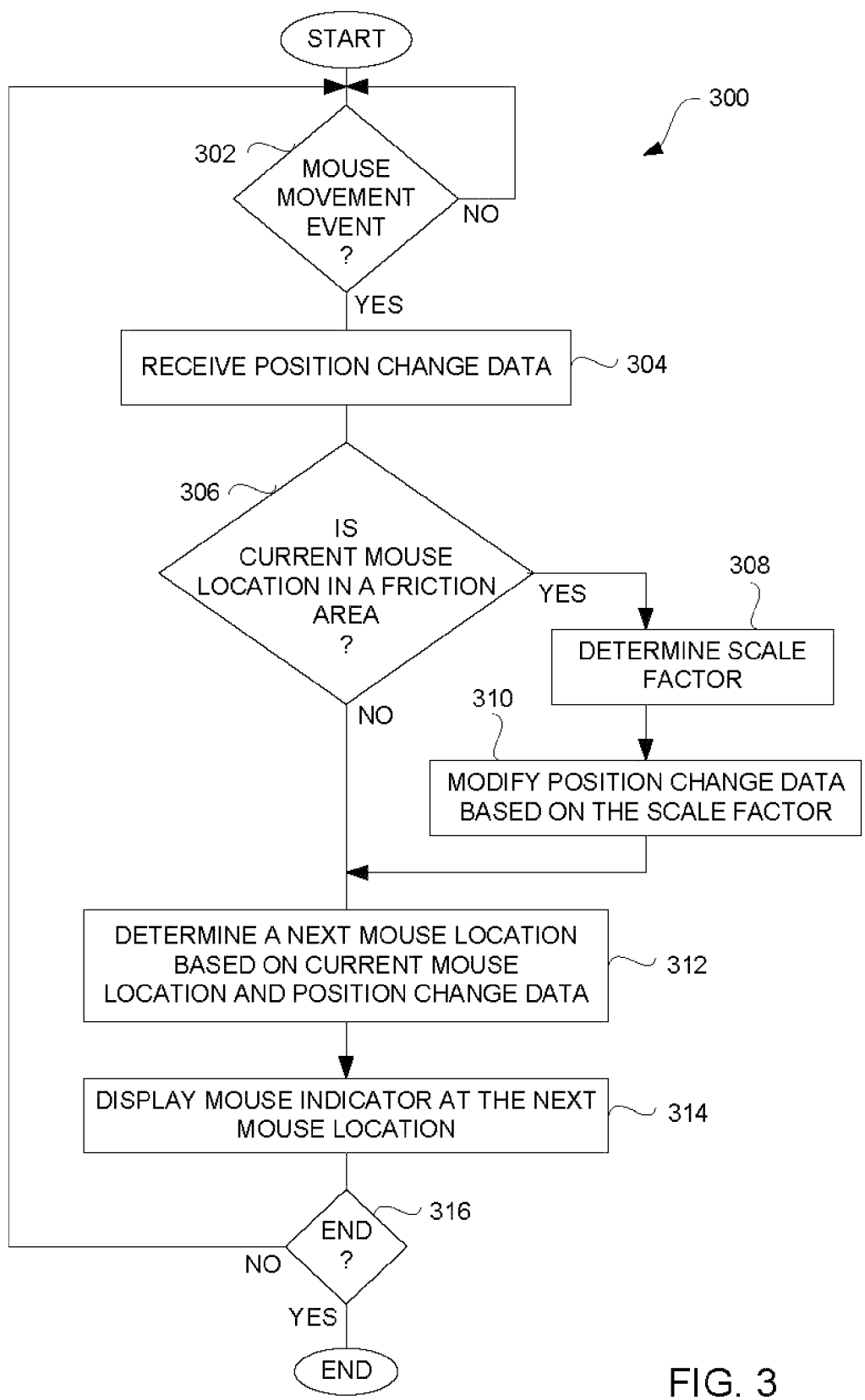
FIG. 3 is a flow diagram of a mouse movement process according to one embodiment of the invention.

FIG. 3 is a flow diagram of a mouse movement process 300 according to one embodiment of the invention. The mouse movement process 300 concerns processing responsive to movement of a pointing device known as a mouse.

The mouse movement process 300 can begin with a decision 302 that determines whether a mouse movement event has occurred. When the decision 302 determines that a mouse movement event has not occurred, the mouse movement process 300 awaits such an event. Alternatively, when the decision 302 determines that a mouse movement event has occurred, the mouse movement process 300 can continue. In particular, position change data can be received 304. The position change data can be relative to a current mouse rotation. In one embodiment, the position change data can reflect a change in position with respect to the current mouse location.

Next, a decision 306 determines whether the current mouse location is within a friction area. A friction area is a predetermined area associated with a graphical user interface that is designated to impose a frictional effect to mouse movement when within the friction area. In one embodiment, the mouse movement within the friction area is less responsive so that user positioning of the mouse within the friction area is easier to achieve. When the decision 306 determines that the current mouse location is within the friction area, a scale factor can be determined 308. Next, position change data can be modified 310 based on the scale factor.

Following the block 310, or directly following the decision 306 when the current mouse location is not within a friction area, a next mouse location is determined 312 based on the current mouse location and the position change data. A mouse indicator can then be displayed 314 at the next mouse location. In one embodiment, the next mouse location is displayed 314 with reference to a graphical user interface.

Following the block 314, a decision 316 determines whether the mouse movement process 300 should end. When the decision 316 determines that the mouse movement process 300 should not end, the mouse movement process 300 returns to repeat the decision 302 so that additional mouse movements are able to be similarly processed. On the other hand, when the decision 316 determines that the mouse movement process 300 should end, the mouse movement process 300 ends.

Figure 4:
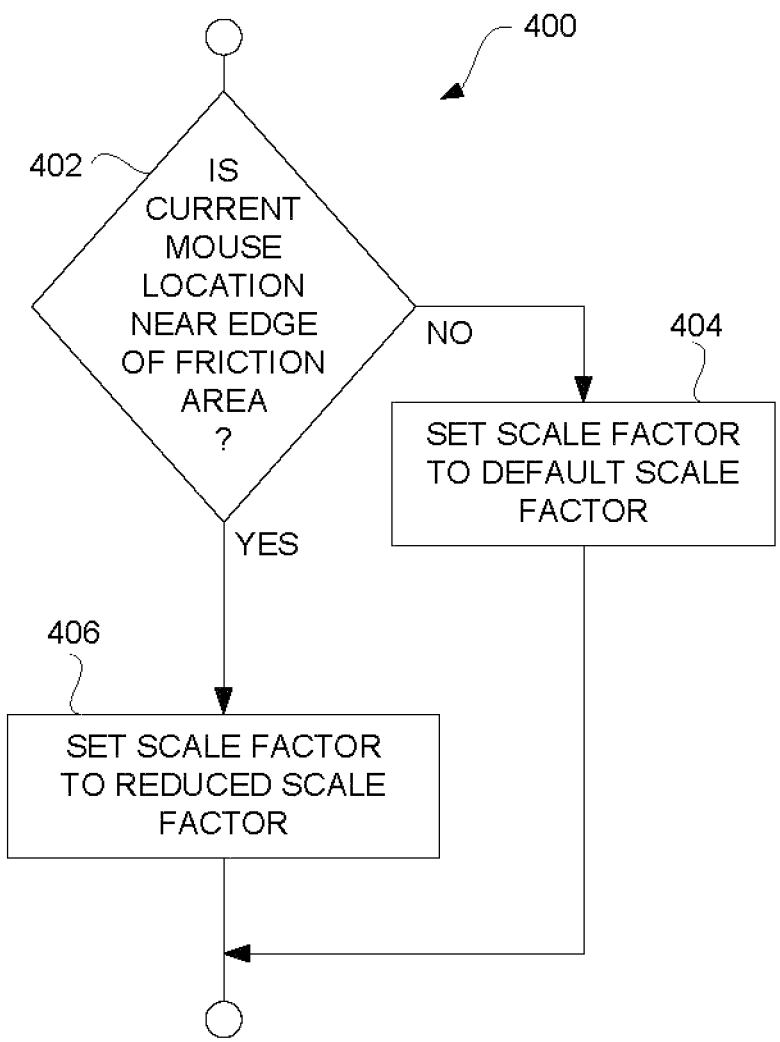
FIG. 4 is a flow diagram of a scale factor determination process according to one embodiment of the invention.

FIG. 4 is a flow diagram of a scale factor determination process 400 according to one embodiment of the invention. The scale factor determination process 400 is, for example, processing that can be performed by the block 308 illustrated in FIG. 3. In other words, the scale factor determination process 400 operates, in accordance with one embodiment, to determine (e.g., select) one or more scale factors.

The scale factor determination process 400 includes a decision 402 that determines whether the current mouse location is near an edge of a friction area. When the decision 402 determines that the current mouse location is not near the edge of a friction area, the scale factor can be set 404 to a default scale factor. Alternatively, when the decision 402 determines that the current mouse location is near the edge of the friction area, the scale factor can be set 406 to a reduced scale factor. For example, if the default scale factor is represented as 1 millimeter to 10 pixels (1:10), then the reduced scale factor could be represented as 1 millimeter to 3 pixels (1:3). Following the blocks 404 and 406, the scale factor determination process 400 can be completed since the appropriate scale factor has been set 404, 406.

Accordingly, in the embodiment illustrated in FIG. 4, the scale factor to be utilized when the current mouse location is near the edge of a friction area can be different than the scale factor otherwise utilized when the current mouse location is within the friction area. As one example, the scale factor could be represented as 1 millimeter to 3 pixels (1:3) when the mouse location is near the edge, but otherwise could be represented as 1 millimeter to 5 pixels (1:5) when within the friction region. As another example, the scale factor could be represented as 1 millimeter to 3 pixels (1:3) when near the mouse location is near the edge, but otherwise could be represented as 1 millimeter to 10 pixels (1:10), whereby the friction region is associated with a boarder region of about a user interface control. The scale factor of 1 millimeter to 10 pixels (1:10) can be considered a default scale factor or a normal scale factor that imposes with no friction effect. In other embodiments, within the friction area, the scale factor can be set differently. In one embodiment, the scale factor can be dependent upon the current mouse location within the friction area as compared to the center of the friction area. For example, the scale factor can be further reduced as the current mouse location gets closer to the center of the friction area.

Figure 1:
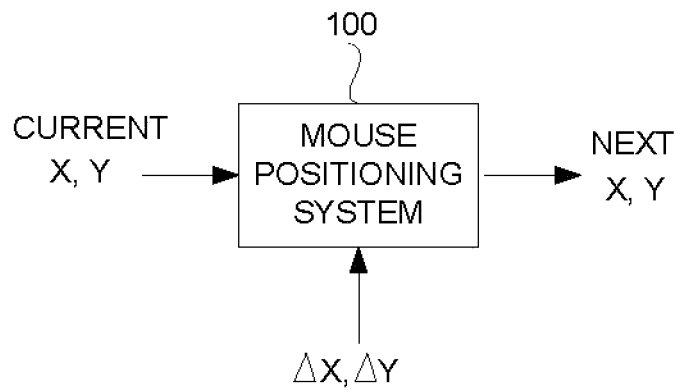
FIG. 1 illustrates a conventional mouse positioning system.
Figure 5:
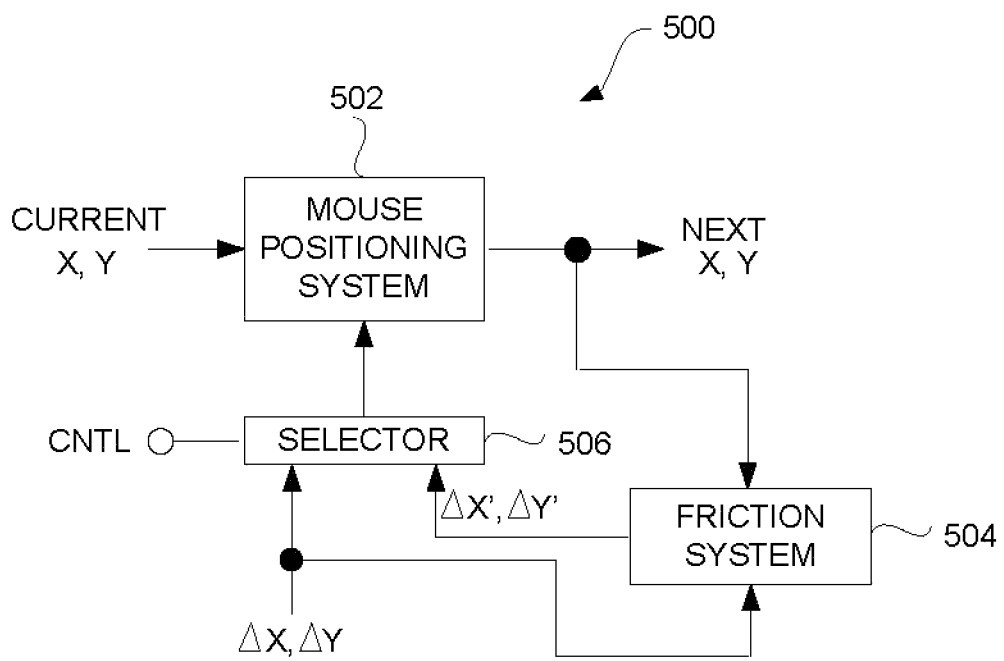
FIG. 5 is a block diagram of a mouse movement system according to one embodiment of the invention.

FIG. 5 is a block diagram of a mouse movement system 500 according to one embodiment of the invention. The mouse movement system 500 includes a mouse positioning system 502. The mouse positioning system 502 knows the current mouse position (Current X, Y) and operates to produce a next mouse position (Next X, Y). The mouse movement system 500 also includes a frictional system 504. The frictional system 504 receives a position change ($\Delta X$, $\Delta Y$) corresponding to mouse movement. The friction system 504 also receives the next position (Next X, Y) from the mouse positioning system 502. The friction system 504 operates to modify the position change based on the next position for the mouse. Alternatively, the friction system 504 could be coupled to receive the current position (Current X, Y) instead of the next position (Next X, Y). In any case, the friction system 504 can output a modified position change ($\Delta X'$, $\Delta Y'$) to a selector 506. The modified position change reflects the frictional effect being opposed by the friction system. The selector 506 also receives the position change ($\Delta X$, $\Delta Y$). The selector 506 operates in accordance with a control signal (CNTL) to select either the position change ($\Delta X$, $\Delta Y$) or the modified position change ($\Delta X'$, $\Delta Y'$). In one embodiment, the selector 506 selects the modified position change ($\Delta X'$, $\Delta Y'$) when the position of the mouse is determined to be within a friction area, and selects the (unmodified) position change ($\Delta X$, $\Delta Y$) when the position of the mouse is determined not to be within a friction area. The output of the selector 506 is then supplied to the mouse positioning system 502 so that the mouse positioning system 502 can apply the position change data to the current position to produce a next position for the mouse.

Figure 6A:
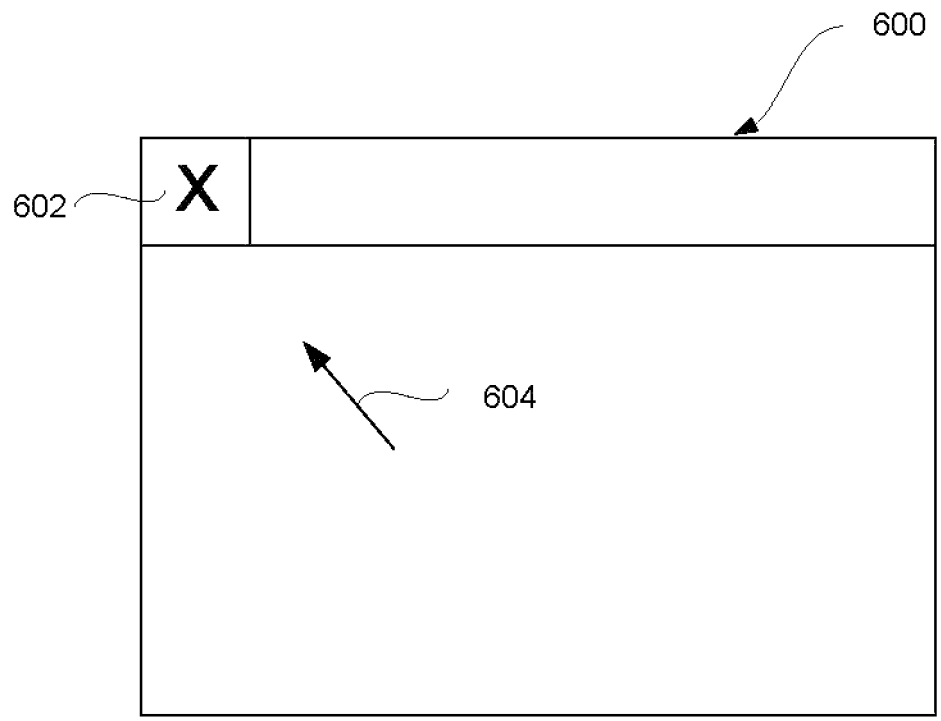
FIGS. 6A-6C are exemplary screens that can be presented on a display device associated with a computing system according to one embodiment of the invention.
Figure 6B:
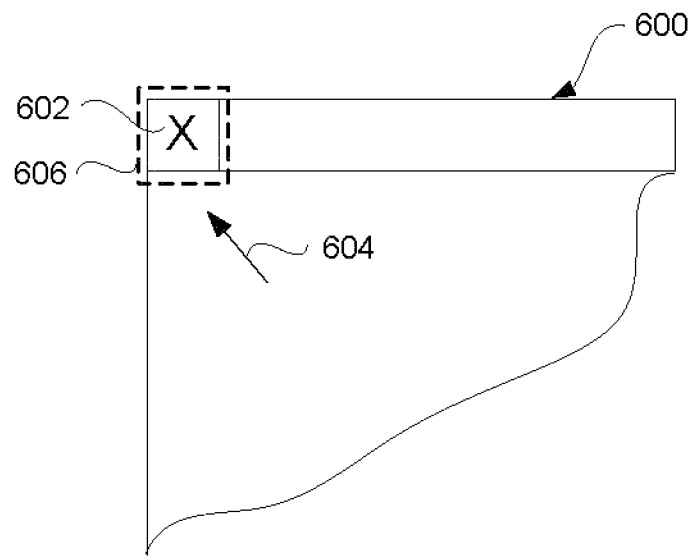
Figure 6C:
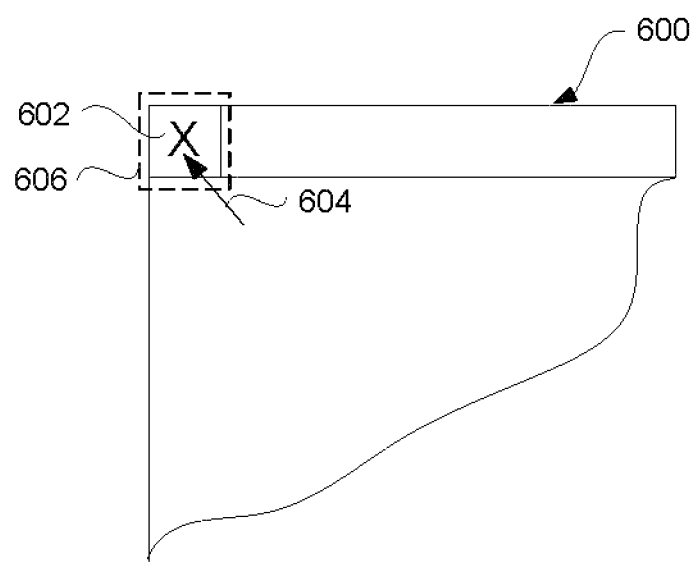

FIGS. 6A-6C are exemplary screens that can be presented on a display device associated with a computing system according to one embodiment of the invention. FIG. 6A illustrates a simplified exemplary graphical user interface 600 that can be presented on a display screen according to one embodiment of the invention. The graphical user interface 600 includes a user interface control 602. The graphical user interface 600 also includes a position indicator 604. The position indicator 604 is, for example, a cursor that is displayed on the display screen so that a user can interact with the graphical user interface 600. The position indicator 604 is moved by the user through physical manipulation of a pointing device, such as a mouse or track ball. The position indicator 604 can be moved via the pointing device to any part of the graphical user interface 600.

FIG. 6B illustrates an exploded portion of the graphical user interface 600 illustrated in FIG. 6A. The graphical user interface 600 illustrated in FIG. 6B depicts the user interface control 602, the positioning indicator 604, and a bounding region 606. In this illustrated embodiment, the bounding region 606 is approximately commensurate with the region associated with the user interface control 606. More particularly, in this embodiment, the bounding region 606 is slightly larger than the region associated with the user interface control 602. However, it should be recognized the bounding blocks 606 can, in general, be the same size or slightly larger or smaller than the region associated with the user interface control 602. As illustrated in FIG. 6B, the position indicator 604 has now moved close to the user interface control 602 but not yet within the bounding region 606. Hence, movement of the position indicator 604 still operates in a normal fashion (i.e., no frictional effect applied).

FIG. 6C illustrates the exploded portion on the graphical user interface 600 illustrated in FIG. 6B after the position indicator 604 has been moved within the bounding region 606. Hence, as this point, since the position indicator 604 is within the bounding region 606, a frictional effect is imposed on movement of the position indicator 604 by way of the pointing device. Hence, in one embodiment, the frictional effect imposed on the movement of the position indicator 604 alters the sensitivity or responsiveness of the movement. As a result, the user that is manipulating the pointing device to move the position indicator 604 can experience a frictional effect. The frictional effect can slow the interaction or movement of the position indicator 604 when within the bounding region 606 so that the user is better able to select or interact with the user interface control 602.

A user interface control is typically part of a graphical user interface. In one embodiment, a user interface control can be programmatically defined to include a friction area and/or a gravity area.

The frictional effect or the scale factor being utilized to provide the responsive control can be implemented in a variety different ways. The responsiveness control can be linear, logarithmic, or step-function, etc.

FIGS. 7A-7D are exemplary graphs illustrating scale factors that can be utilized with respect to movement of a displayed position indicator associated with a pointing device.

Figure 7A:
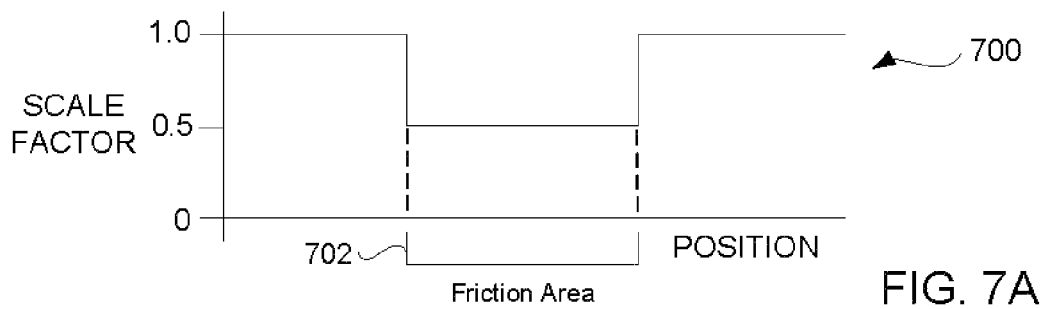
FIGS. 7A-7D are exemplary graphs illustrating scale factors that can be utilized with respect to movement of a displayed position indicator associated with a pointing device.

FIG. 7A illustrates a scale factor graph 700 according to one embodiment of the invention. The scale factor graph 700 illustrates scale factor verses position. When the position of a position indicator, e.g., cursor, is within a friction area 702, the scale factor graph 700 indicates that the scale factor can be reduced by a significant percentage, e.g., 50%. In this example, there is no scaling when the position indicator is not within the friction area 702. However, when the position indicator is within the friction area 702, the scale factor causes a reduction in the responsiveness to movements by a factor of two (2).

Figure 7B:
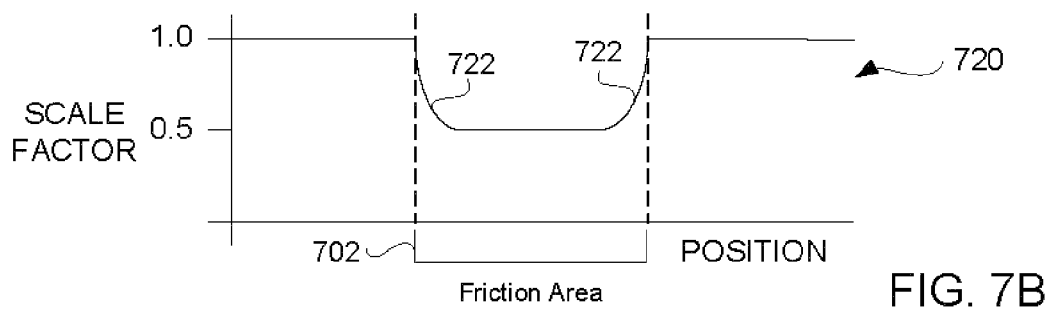

FIG. 7B illustrates a scale factor graph 720 according to another embodiment of the invention. In this embodiment, the scale factor is generally similar to the scale factor being imposed with respect to the scale factor graph 700 illustrated in FIG. 7A. However, in the scale factor graph 720, the reduction in scale factor is logarithmic so that at transitions at the friction area 702 follow a logarithmic curve 722.

Figure 7C:
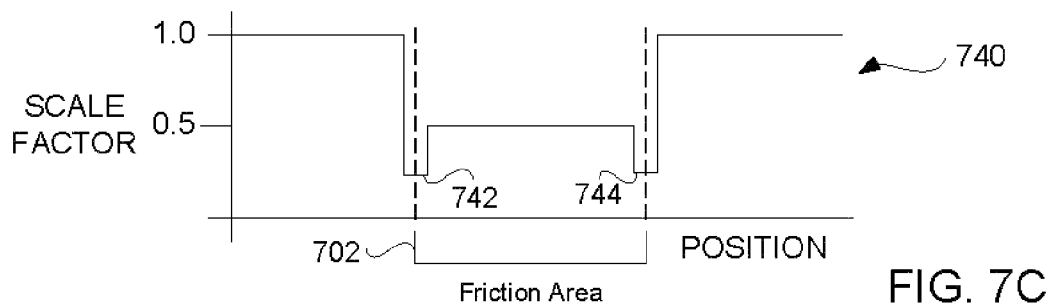

FIG. 7C illustrates a scale factor graph 740 according to another embodiment of the invention. The scale factor is generally reduced by a scale factor of two (2) when the position indicator for the pointing device is within the friction area 702. However, at the edges of the friction area 702, additional scaling is provided. The scale factor graph 740 includes edge scale factors 742 and 744. In particular, the scale factor being imposed while the position indicator is at the edges of the friction area 702 can be a scale factor of four-thirds (4/3), which is a reduction by three-fourths (75%).

Figure 7D:
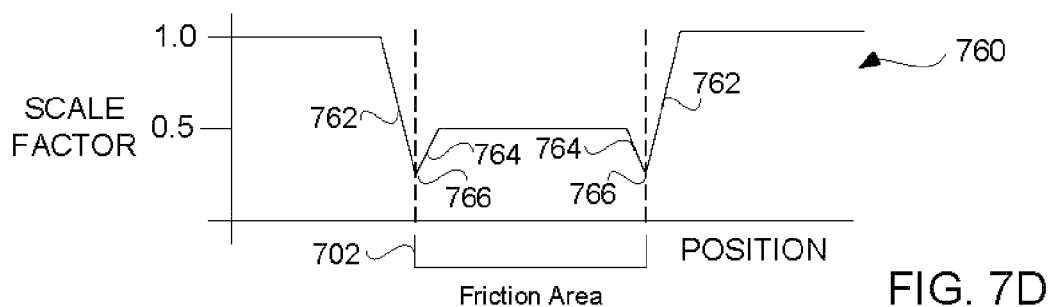

FIG. 7D illustrates a scale factor graph 760 according to still another embodiment of the invention. The scale factor graph 760 includes sloping transitions 762 and 764. The scaling factor imposed at the edges of the friction area 702 are also further scaled downward by the sloping transitions 762 and 764 which form troughs 766.

FIGS. 8-14C pertain to embodiments of the invention that provide a gravitational effect to pointing device (e.g., mouse) movement.

Figure 8:
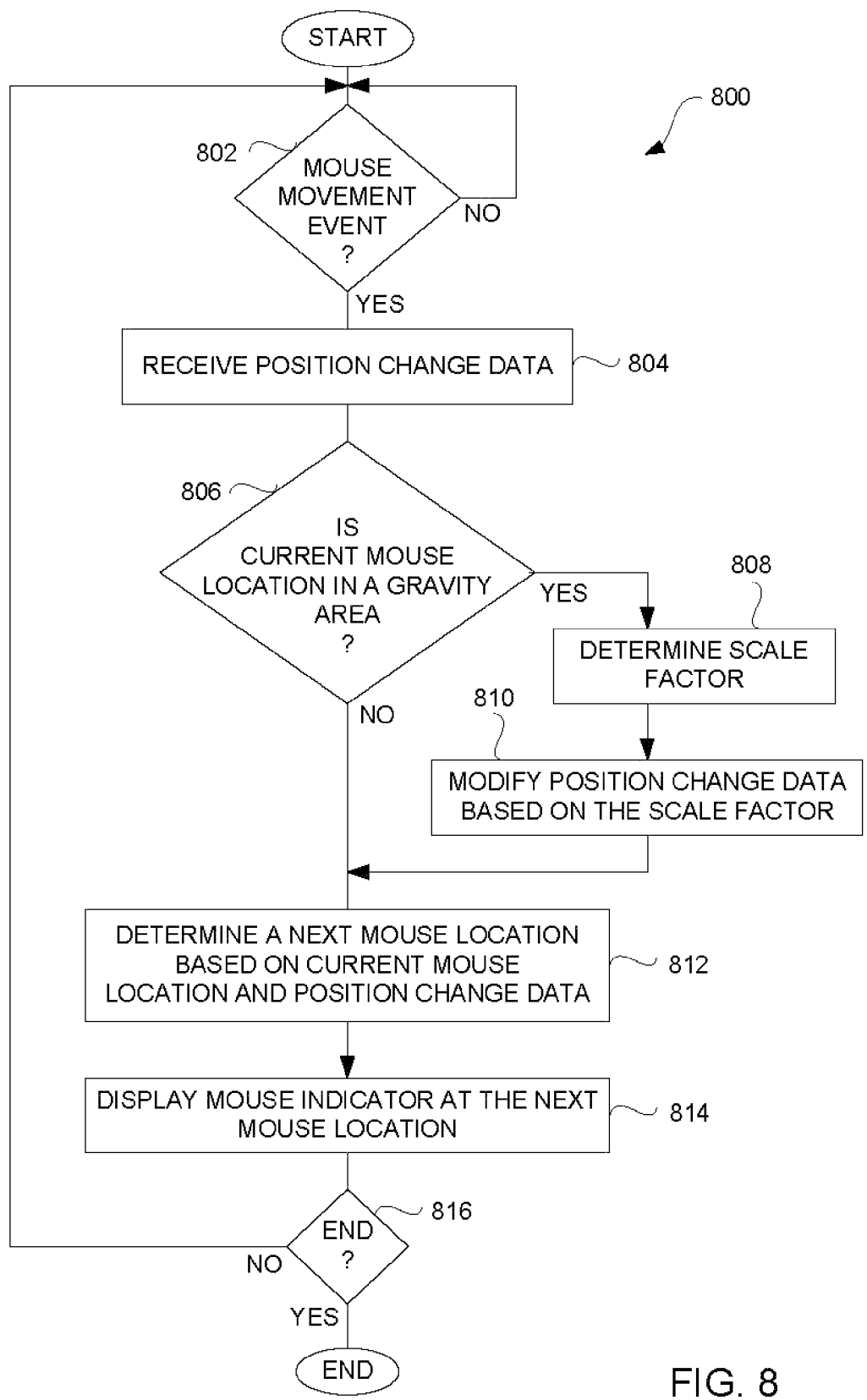
FIG. 8 is a flow diagram of a mouse movement process according to another embodiment of the invention.

FIG. 8 is a flow diagram of a mouse movement process 800 according to another embodiment of the invention. The mouse movement process 800 concerns processing responsive to movement of a pointing device known as a mouse.

The mouse movement process 800 can begin with a decision 802 that determines whether a mouse movement event has occurred. When the decision 802 determines that a mouse movement event has not occurred, the mouse movement process 800 awaits such an event. Alternatively, when the decision 802 determines that a mouse movement event has occurred, the mouse movement process 800 can continue. In particular, position change data can be received 804. The position change data can be relative to a current mouse rotation. In one embodiment, the position change data can reflect a change in position with respect to the current mouse location.

Next, a decision 806 determines whether the current mouse location is within a gravity area. A gravity area is a predetermined area associated with a graphical user interface that is designated to impose a gravitational effect to mouse movement when within the gravity area. In one embodiment, the mouse movement within the gravity area is more responsive when moving towards a center of the gravity area and is less responsive when moving away from the center of the gravity area. Hence, as a result of the gravity area, the user can experience a gravitational like effect when moving within the gravity area. For example, the gravitational effect experienced by a user can feel like the mouse is being slightly pulled towards the center of the gravity area. When the decision 806 determines that the current mouse location is within the gravity area, a scale factor can be determined 808. Next, position change data can be modified 810 based on the scale factor.

Following the block 810, or directly following the decision 806 when the current mouse location is not within a gravity well, a next mouse location is determined 812 based on the current mouse location and the position change data. A mouse indicator can then be displayed 814 at the next mouse location. In one embodiment, the next mouse location is displayed 814 with reference to a graphical user interface.

Following the block 814, a decision 816 determines whether the mouse movement process 800 should end. When the decision 816 determines that the mouse movement process 800 should not end, the mouse movement process 800 returns to repeat the decision 802 so that additional mouse movements are able to be similarly processed. On the other hand, when the decision 816 determines that the mouse movement process 800 should end, the mouse movement process 800 ends.

Figure 9:
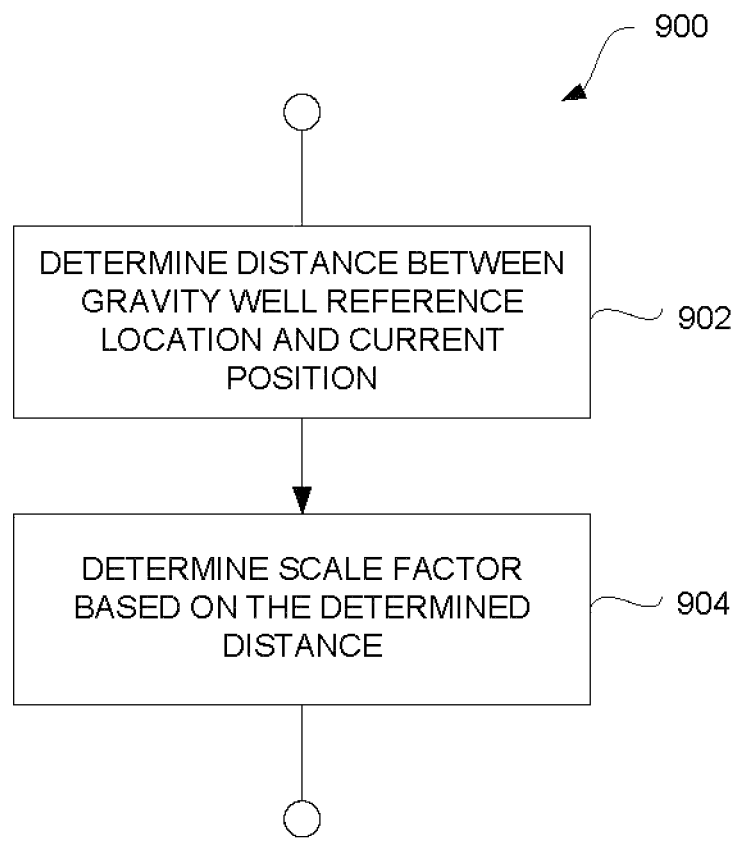
FIG. 9 is a flow diagram of a scale factor determination process according to one embodiment of the invention.

FIG. 9 is a flow diagram of a scale factor determination process 900 according to one embodiment of the invention. The scale factor determination process 900 is, for example, processing that can be performed by the block 808 illustrated in FIG. 8. In other words, the scale factor determination process 900 operates, in accordance with one embodiment, to determine (e.g., select) one or more scale factors.

The scale factor determination process 900 includes a determination 902 of a distance between a gravity well reference location and the current position of the mouse. The gravity well reference location can, for example, pertain to the center of the gravity well. Next, the scale factor can be determined based on the determined distance. In one implementation, the scale factor can be dependent on the determined distance. For example, when the determined distance is small, the scale factor can be greater, and when the determine distance is large, the scale factor can be smaller. In another implementation, a vector from the current position to the gravity well reference location can be used to determine the scale factor. The vector can provide the determined distance and/or a determined direction. If the determined direction is approximately towards the gravity well reference location, a larger scale factor can be used. On the other hand, when the determined direction is approximately away from the gravity well reference location, a smaller scale factor can be used. For example, if with no scaling mouse movement corresponds to 1 millimeter to 5 pixels (1:5), then the larger scale factor could be represented as 1 millimeter to 7 pixels (1:7)

and the smaller scale factor could be represented as 1 millimeter to 3 pixels (1:3). In another embodiment, the scale factor can be dependent upon the current mouse location within the gravity area as compared to the center of the gravity area. In other embodiments, within the gravity area, the scale factor can be set differently.

In one embodiment, the scale factor can be influenced by more than one gravity area. For example, if the current mouse location happens to be within more than one gravity area, then the effective scale factor can be based on the gravitation effect of more than one gravitational effect. These multiple gravitation effects can be construction or destructively combined such that the combined gravitational effect is different than the individual gravitational effects.

In addition, the scale factor can be dependent on not only a gravitational area but also a friction area. The friction area can impose a frictional effect, which the gravity area imposed a gravitational effect.

Figure 10:
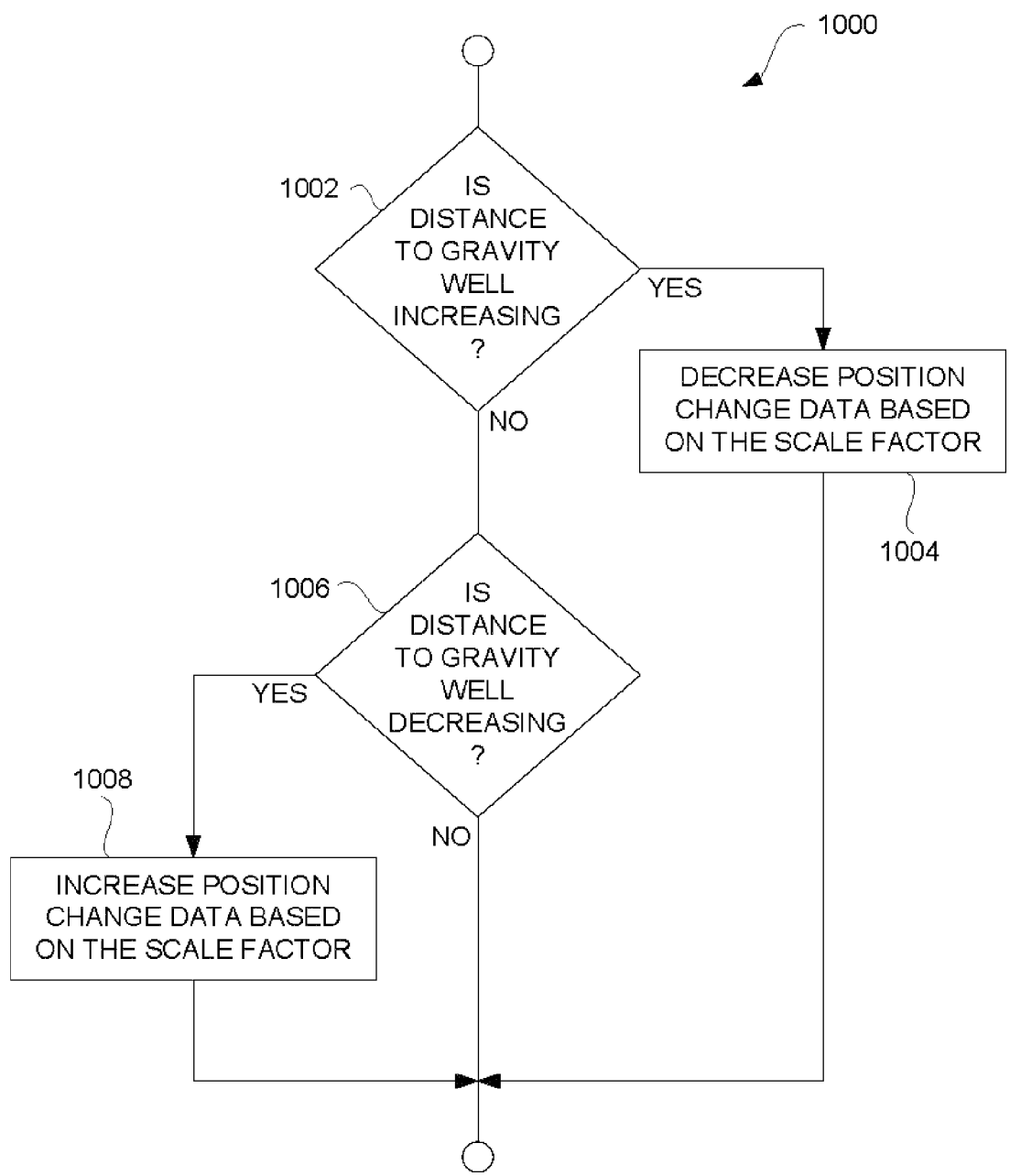
FIG. 10 is a position change data modification process according to one embodiment of the invention.

FIG. 10 is a position change data modification process 1000 according to one embodiment of the invention. The s position change data modification process 1000 is, for example, processing that can be performed by the block 810 illustrated in FIG. 8. In other words, the position change data modification process 1000 operates, in accordance with one embodiment, to modify position change data in accordance with a determined scale factor so as to impose a gravitational effect to position change data associated with mouse movement.

The position change data modification process 1000 includes a decision 1002 that determines whether the distance to the gravity well is increasing. For example, when the distance to the gravity well is increasing, it can be presumed that the mouse is being moved away from the gravity well. In one implementation, the gravity well is at a center position of the gravity area. When the decision 1002 determines that the distance to the gravity well is increasing, then the position change data can be decreased 1004 based on the scale factor. On the other hand, when the decision 1002 determines that the distance to the gravity well is not increasing, a decision 1006 determines whether the distance to the gravity well is decreasing. When the decision 1006 determines that the distance to the gravity well is decreasing, then the position change data can be increased 1008 based on the scale factor. In yet another alternative, when the distance to the gravity well is neither increasing or decreasing, the position change data modification process 1000 does not modify the position change data. The position change data modification process 1000 can end after the block 1004 when the distance to the gravity well is increasing, the block 1008 when the distance to the gravity well is decreasing, or following the decision 1006 when the distance to the gravity well is neither increasing or decreasing. The resulting effect of the position change data modification process 1000 on the mouse movement is that is a gravitational effect can be imposed, whereby it appears to the user that the mouse is subject to the gravitation field of the gravity well while the mouse is within the gravity area.

Figure 11:
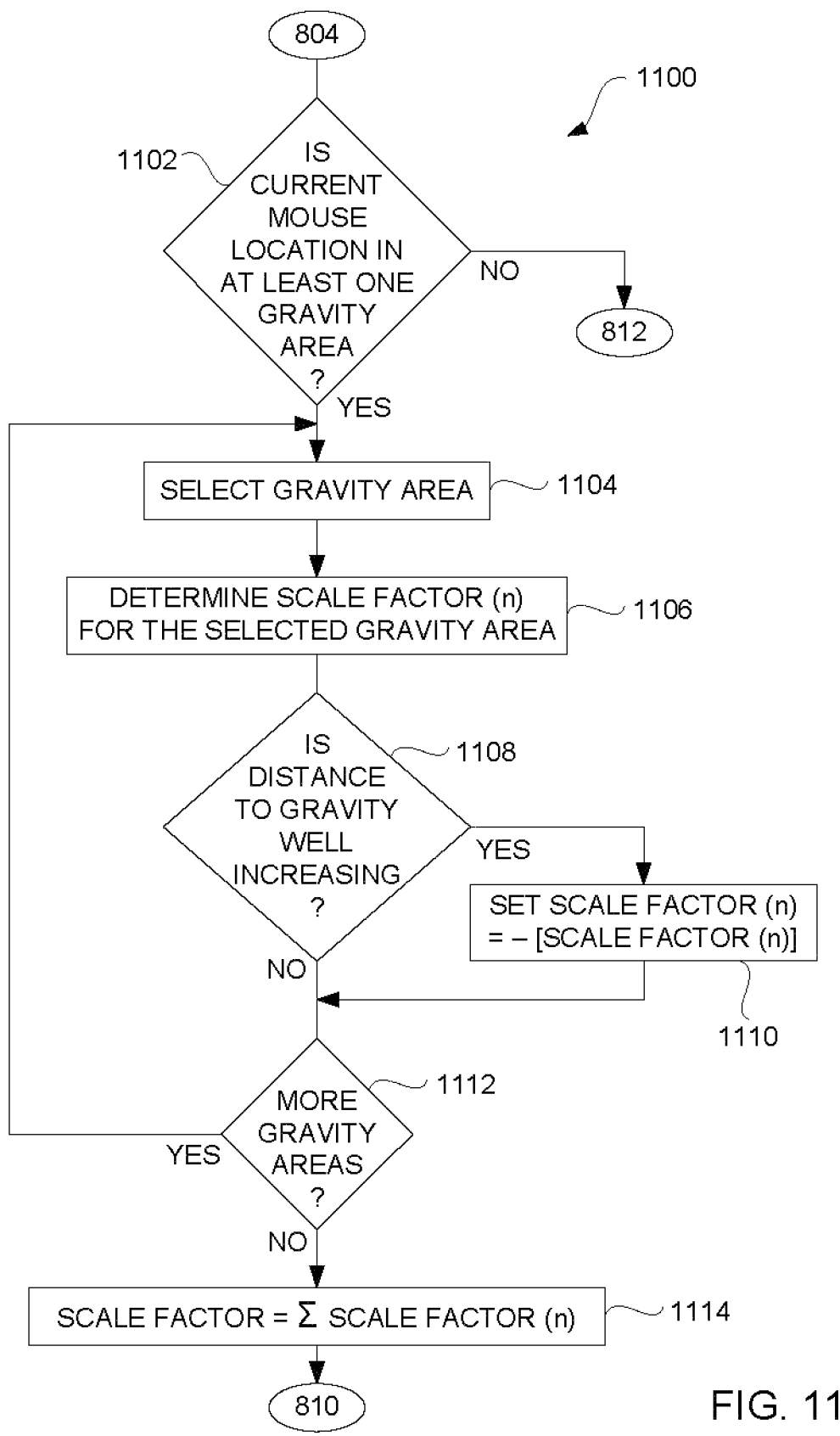
FIG. 11 is a flow diagram of a scale factor process for one or more gravitational areas according to one embodiment of the invention.

FIG. 11 is a flow diagram of a scale factor process 1100 for one or more gravitational areas according to one embodiment of the invention. The scale factor process 1100 concerns applying one or more gravitational effects being imposed by one or more gravitational areas. The one or more gravitational effects are processed responsive to movement of a pointing device known as a mouse. The scale factor process 1100 is described in an embodiment that can replace the blocks 806-812 of the mouse movement process 800 illustrated in FIG. 8.

The scale factor process 1100 includes a decision 1102 that determine whether the current mouse location is in at least one gravity area. When the decision 1102 determines that the current mouse location is not within any gravity area, then the scale factor process 100 can proceed to block 812 of the mouse movement process 800 without producing a scale factor. Here, there is no gravitation effect imposed. On the other hand, when the decision 1102 determines that the current mouse location is within one or more gravity areas, one of the gravity areas is selected 1104 for processing. A scale factor (n) for the selected gravity area can then be determined 1106. Different gravity areas can have different scale factors. The scale factor can also be dependent on the distance and/or direction of movement of the current mouse location with respect to a gravity well (e.g., or center) of the selected gravity area. Further, a decision 1108 can determine whether the distance between the current mouse location and the gravity well (e.g., or center) of the selected gravity area is increasing (i.e., getting further apart). When the decision 1108 determines that the distance between the current mouse location and the gravity well (e.g., or center) of the selected gravity area is increasing, then the scale factor is set 1110 to a negative value to cause a gravitation effect to be imposed. Alternatively, when the distance between the current mouse location and the gravity well (e.g., or center) of the selected gravity area is not increasing (e.g., same or decreasing), the scale factor remains set 1110 to a positive value. Next, a decision 1112 determines whether more gravity areas are to be processed. When the decision 1112 determines that at least one additional gravity area is to be processed, the scale factor process 1100 can return to repeat the block 1104 so that an additional gravity area can be processed in a similar manner to produce another scale factor (n). When the scale factor process 1100 produces multiple scale factors (n), the scale factors 1114 can be summed together to yield a composite scale factor. Thereafter, the scale factor process 1100 is complete and the resulting scale factor (e.g., composite scale factor) can be used to modify 810 the position change data based on the composite scale factor. In this embodiment, the scale factor is positive or negative and thus indicates controls whether the scale factor makes the position change data more responsive or less responsive; hence, the position change data modification process 1000 illustrated in FIG. 10 is not needed.

Figure 12:
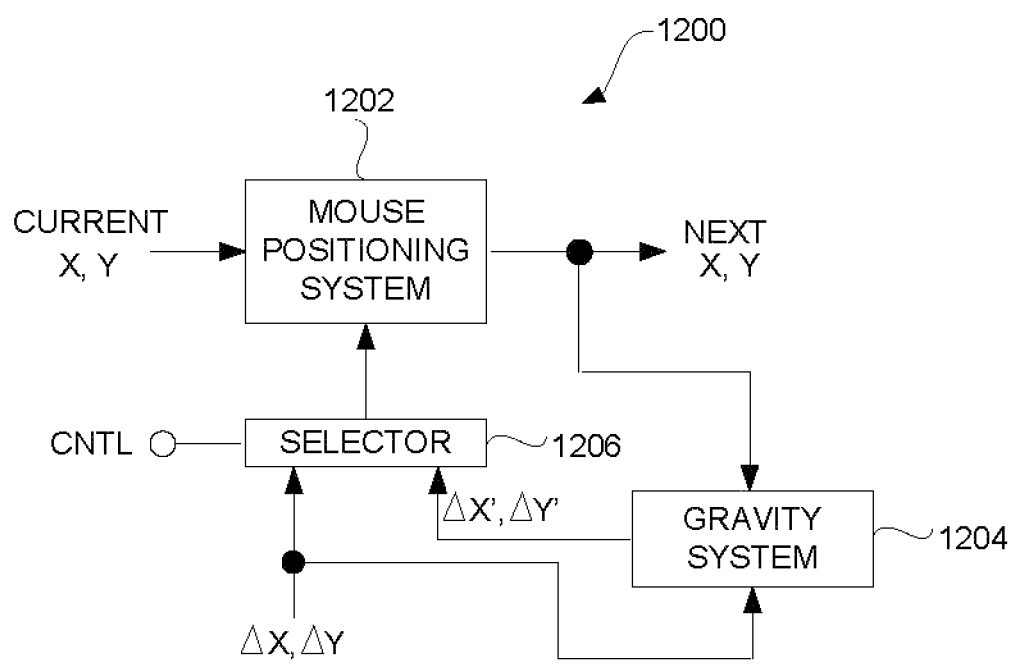
FIG. 12 is a block diagram of a mouse movement system according to one embodiment of the invention.

FIG. 12 is a block diagram of a mouse movement system 1200 according to one embodiment of the invention. The mouse movement system 1200 includes a mouse positioning system 1202. The mouse positioning system 1202 knows the current mouse position (Current X, Y) and operates to produce a next mouse position (Next X, Y). The mouse movement system 1200 also includes a gravity system 1204. The gravity system 1204 receives a position change ($\Delta X, \Delta Y$) corresponding to mouse movement. The gravity system 1204 also receives the next position (Next X, Y) from the mouse positioning system 1202. The gravity system 504 operates to modify the position change based on the next position for the mouse. Alternatively, the gravity system 1204 could be coupled to receive the current position (Current X, Y) instead of the next position (Next X, Y). In any case, the gravity system 1204 can output a modified position change ($\Delta X', \Delta Y'$) to a selector 1206. The modified position change reflects the gravitational effect being opposed by the gravity system. The selector 1206 also receives the position change ($\Delta X, \Delta Y$). The selector 1206 operates in accordance with a control signal (CNTL) to select either the position change ($\Delta X, \Delta Y$) or the modified position change ($\Delta X', \Delta Y'$). In one embodiment, the selector 1206 selects the modified position change ($\Delta X', \Delta Y'$) when the position of the mouse is determined to be within a gravity area (e.g., using the current position or the next position), and selects the (unmodified) position change (ΔX, ΔY) when the position of the mouse is determined not to be within a gravity area. The output of the selector 1206 is then supplied to the mouse positioning system 1202 so that the mouse positioning system 1202 can apply the position change data to the current position to produce a next position for the mouse.

Figure 13A:
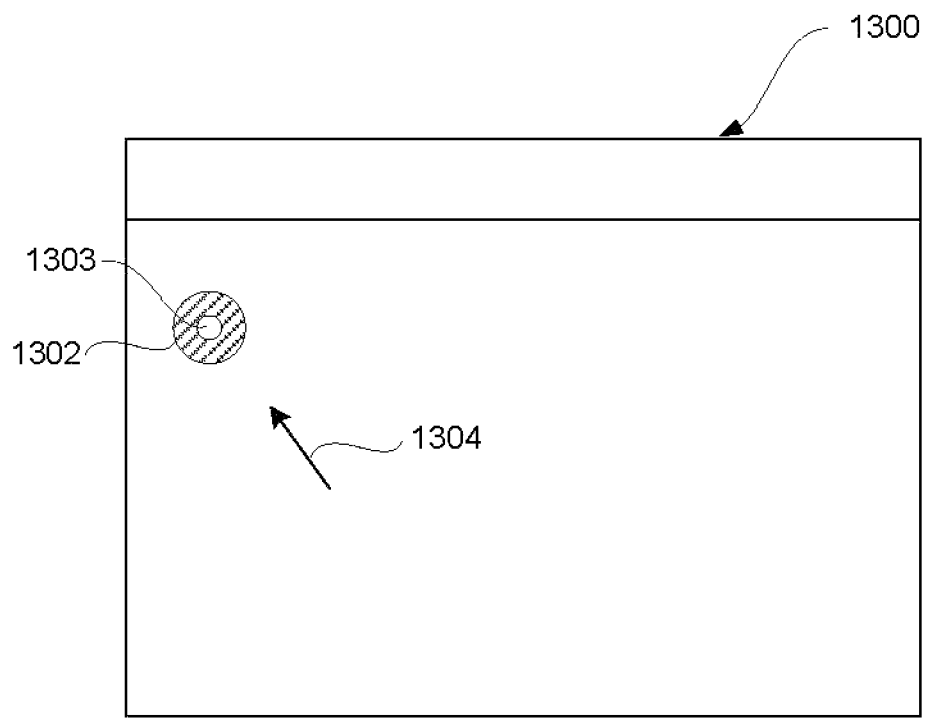
FIGS. 13A-13E are exemplary screens that can be presented on a display device associated with a computing system according to one embodiment of the invention.

FIGS. 13A-13E are exemplary screens that can be presented on a display device associated with a computing system according to one embodiment of the invention. FIG. 13A illustrates a simplified exemplary graphical user interface 1300 that can be presented on a display screen according to one embodiment of the invention. The graphical user interface 1300 includes a user interface control 1302. The user interface control 1302 is an exemplary user interface element that has a gravitational effect. In particular, the user interface control 1302 defines a gravity area within which the gravitational effect is imposed. The center of the gravity area can be denoted a gravity well 1303. Although the user interface control 1302 (and the gravity area) has a circular shape, it should be noted that the user interface control 1302 (and the gravity area) can have various other shapes. The graphical user interface 1300 also includes a position indicator 1304. The position indicator 1304 is, for example, a cursor that is displayed on the display screen so that a user can interact with the graphical user interface 1300. The position indicator 1304 is moved by the user through physical manipulation of a pointing device, such as a mouse or track ball. The position indicator 1304 can be moved via the pointing device to any part of the graphical user interface 1300.

Figure 13B:
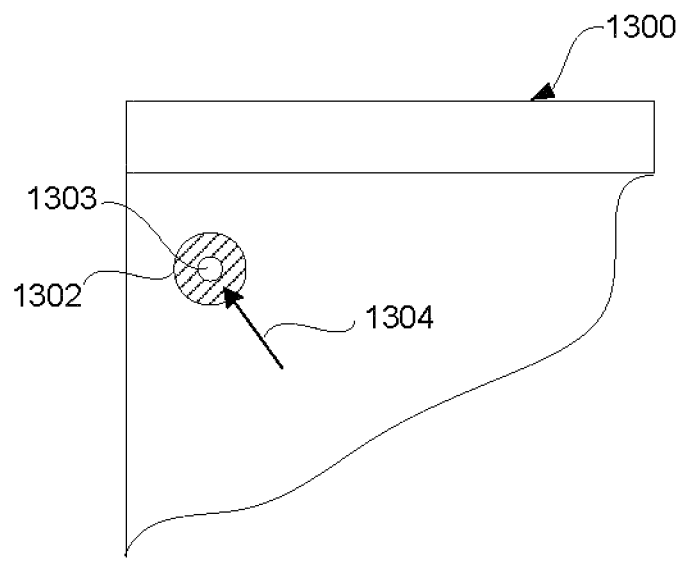

FIG. 13B-13E illustrates an exploded portion of exemplary interaction with the graphical user interface 1300 illustrated in FIG. 13A. The graphical user interface 1300 illustrated in FIG. 13B depicts the user interface control 1302 and the positioning indicator 1304.

The position indicator 1304 has been moved within the user interface control 1302. Hence, as this point, since the position indicator 1304 is within the area associated with the user interface control 1302, a gravitational effect is imposed on movement of the position indicator 1304 by way of the pointing device. Hence, in one embodiment, the gravitational effect imposed on the movement of the position indicator 1304 alters the sensitivity or responsiveness of the movement. As a result, the user that is manipulating the pointing device to move the position indicator 1304 can experience a gravitational effect. The gravitational effect can slow the interaction or movement of the position indicator 1304 to similar a gravitation "pull" toward the gravity well when within the area associated with the user interface control 1302 so that the user is better able to select or interact with the user interface control 1302.

In this illustrated embodiment, the gravitational effect is commensurate with the area of the user interface control 1302. However, in other embodiment, a bounding region can be provided about the user interface control 1302 to provide a larger area for the gravity effect. More particularly, a bounding region can, in general, be the same size or slightly larger or smaller than the area/region associated with the user interface control 1302.

Figure 13C:
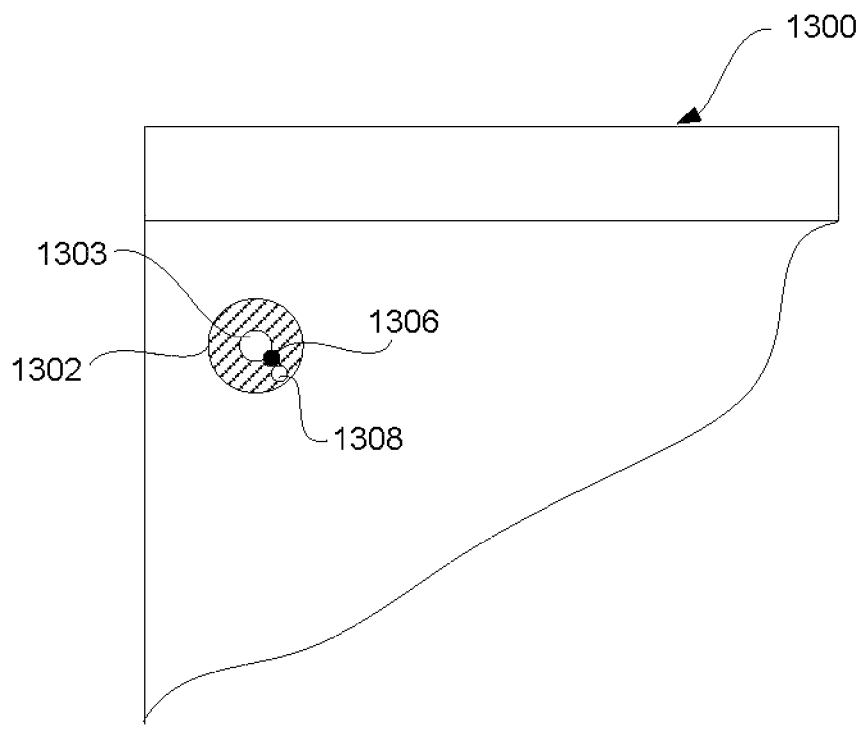

FIG. 13C illustrates an exploded portion of the graphical user interface 1300 where a next position of the position indicator 1304 is illustrated. Here, the position indicator 1304 is being physically moved towards the gravity well of the user interface control 1302. As such, a gravitational effect is imposed on the movement of the position indicator 1304. Specifically, a position 1306 illustrates an actual resulting position of the position indicator 1304 in view of user movement and gravity. As a reference, a position 1308 illustrates an otherwise resulting position of the position indicator if the gravitational effect were not imposed. Note, here, since the position indicator 1304 is being moved towards the gravity well, the gravitation effect causes the movement of the position indicator 1304 to be "pulled" closer to the gravity well. Here, the position indicator 1304 moves more because the gravitational effect is "pulling" the position indicator 1304 towards the gravity well.

Figure 13D:
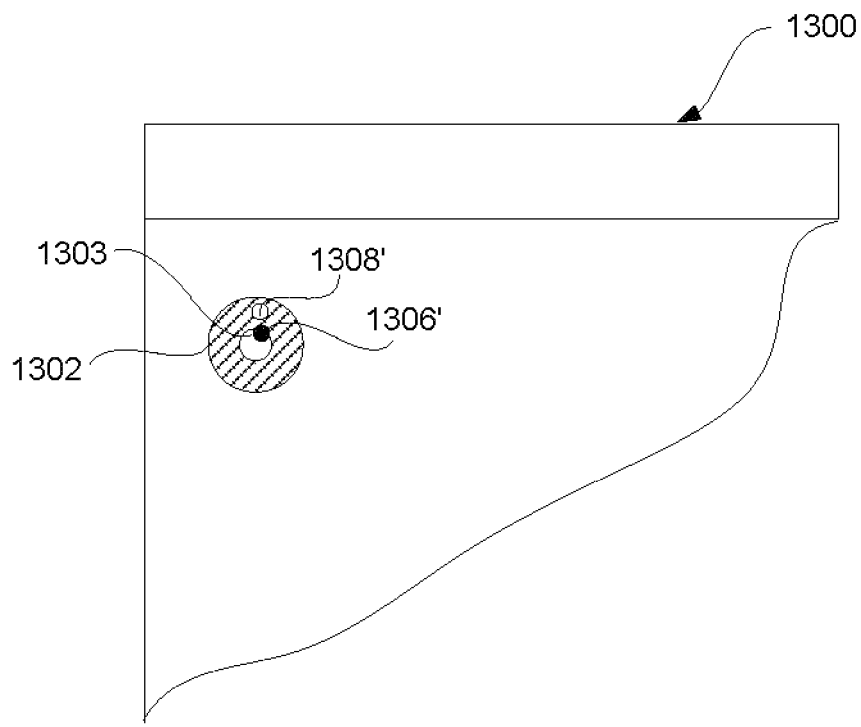

FIG. 13D illustrates an exploded portion of the graphical user interface 1300 where another next position of the position indicator 1304 is illustrated. Here, the position indicator 1304 is being physically moved away from the gravity well of the user interface control 1302. As such, a gravitational effect is imposed on the movement of the position indicator 1304. Specifically, a position 1306' illustrates an actual resulting position of the position indicator 1304 in view of user movement and gravity. As a reference, a position 1308' illustrates an otherwise resulting position of the position indicator if the gravitational effect were not imposed. Note, here, since the position indicator 1304 is being moved away from the gravity well, the gravitation effect causes the movement of the position indicator 1304 to be "pulled" closer to the gravity well. Here, the position indicator 1304 moves a smaller distance because the gravitational effect is "pulling" the position indicator 1304 back towards the gravity well.

Figure 13E:
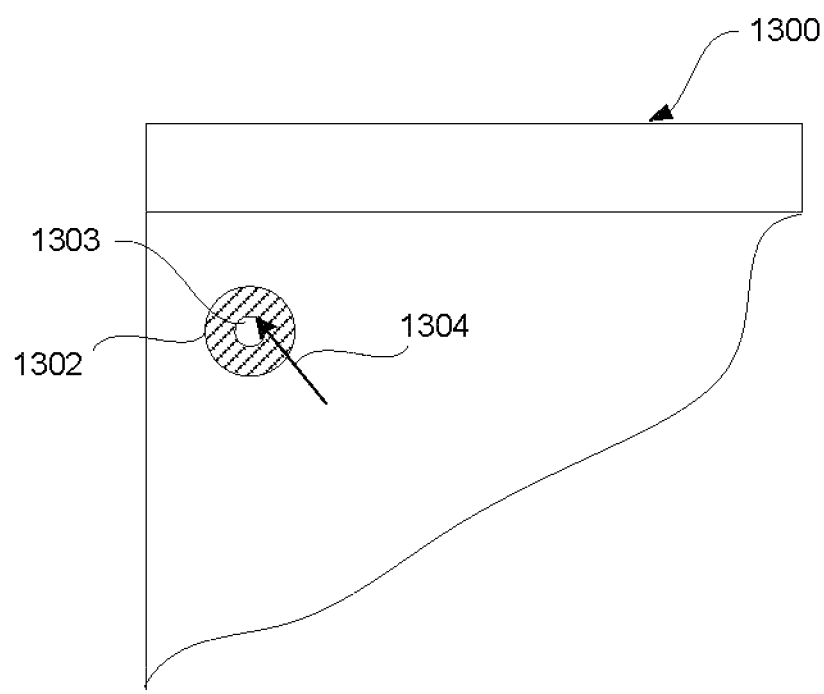

For convenience, the position indicator 1304 is not illustrated in FIGS. 13C and 13D, but its positions are denoted by the positions 1306, 1306', 1308 and 1308'. FIG. 13E illustrates an exploded portion of the graphical user interface 1300 where the position indicator 1304 is illustrated for the another next position that results from the exemplary interaction as depicted in FIG. 13D.

Figure 14A:
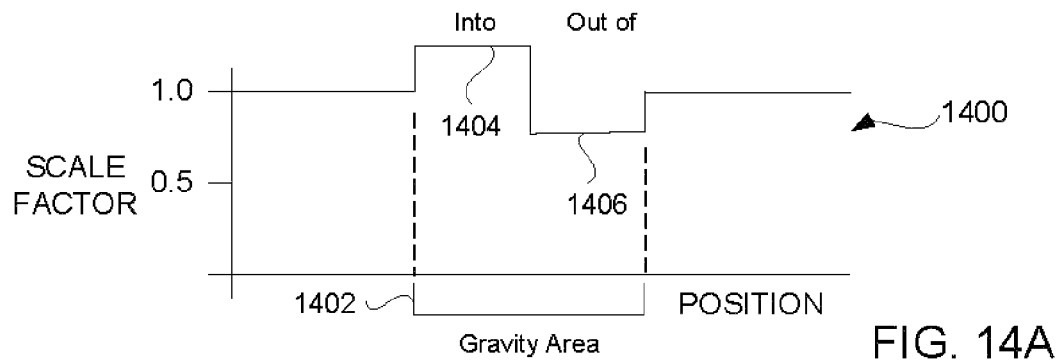
FIGS. 14A-14C are exemplary graphs illustrating scale factors that can be utilized with respect to movement of a displayed position indicator associated with a pointing device.
Figure 14B:
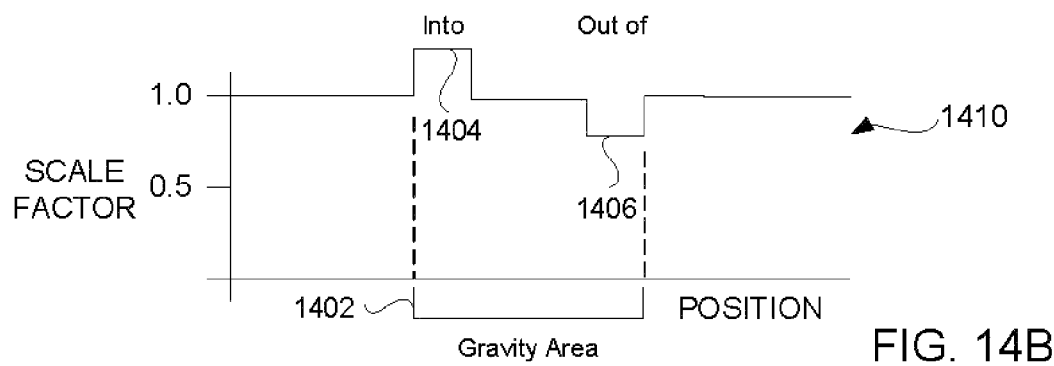
Figure 14C:
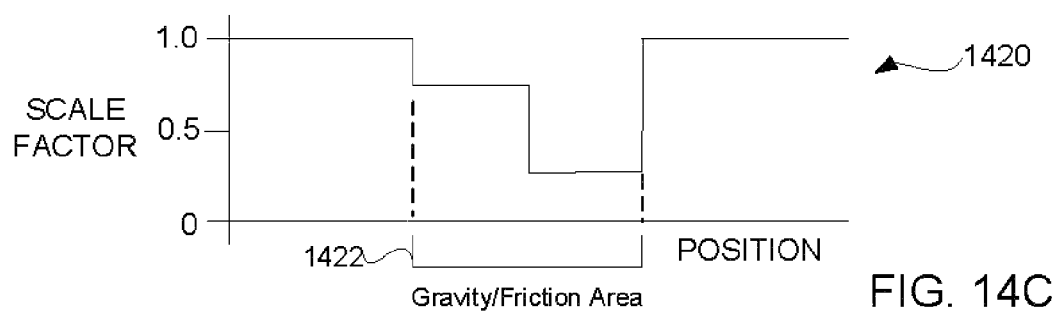
Figure 15:
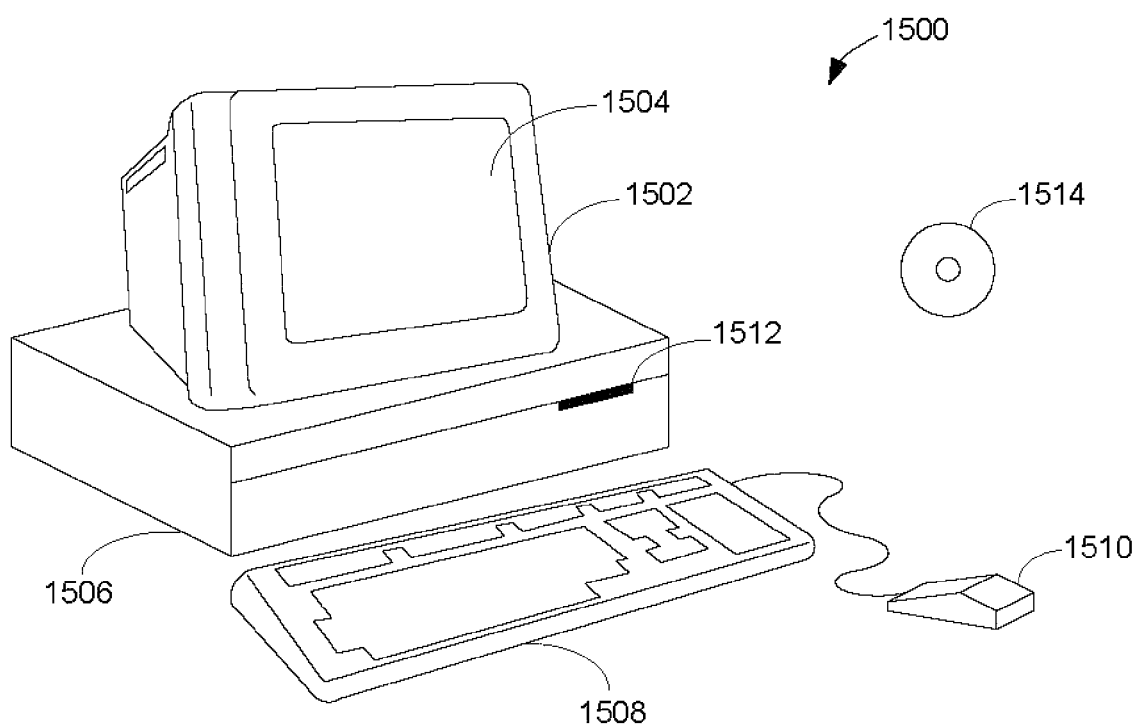
FIG. 15 shows an exemplary computer system suitable for use with at least one embodiment of the invention.

FIGS. 14A-14C are exemplary graphs illustrating scale factors that can be utilized with respect to movement of a displayed position indicator associated with a pointing device.

FIG. 14A illustrates a scale factor graph 1400 according to one embodiment of the invention. The scale factor graph 1400 illustrates scale factor verses position. When the position of a position indicator, e.g., cursor, is within a gravity area 1402, the scale factor graph 1400 indicates that the scale factor can be increased or reduced to impose a gravitational effect. In this example, there is a scaling increase 1404 when the position indicator is moving towards a center portion of the gravity area 1402, and there is a scaling decrease 1406 when the position indicator is moving away from a central portion of the gravity area 1402. There is no scaling when the position indicator is not within the friction area 702. However, when the position indicator is within the friction area 702, the scale factor causes a reduction in the responsiveness to movements by a factor of two (2).

FIG. 14B illustrates a scale factor graph 1410 according to another embodiment of the invention. In this embodiment, the scale factor is generally similar to the scale factor being imposed with respect to the scale factor graph 1400 illustrated in FIG. 14A. However, in the scale factor graph 1410, the gravitational effect is not applied at a central region of the gravity area 1402. Although not shown in FIG. 14A or 14B, the transitions in the scale factor can be smoothed out with curved transitions (e.g., logarithmic curves).

FIG. 14C illustrates a scale factor graph 1420 according to another embodiment of the invention. In this embodiment, the scale factor is impacted by both a frictional effect as well as a gravitational effect. The frictional effect is similar to that illustrated in FIG. 7A, and the gravitational effect is similar to that illustrated in FIG. 14A.

In creating graphical user interfaces, users determine which user interface components to use as well as an arrangement for the various user interface components. One type of user interface component is a user interface control. A user interface control typically has a plurality of attributes that can control its 1 look and/or behavior. According to one embodiment of the invention, a user interface (UI) control can include an attribute (e.g., UI component attribute) that enable a user to enable/disable friction. For example, the attribute can be a "flag" or setting that informs a computing device whether the user interface control is to be used. Other attributes can be provided to specify how the user interface control can be used.

FIG. 8 shows an exemplary computer system 800 suitable for use with at least one embodiment of the invention. The methods, processes and/or graphical user interfaces discussed above can be provided by a computer system. The computer system 800 includes a display monitor 802 having a single or multi-screen display 804 (or multiple displays), a cabinet 806, a keyboard 808, and a mouse 810. The cabinet 806 houses a processing unit (or processor), system memory and a hard drive (not shown). The cabinet 806 also houses a drive 812, such as a DVD, CD-ROM or floppy drive. The drive 812 can also be a removable hard drive, a Flash or EEPROM device, etc. Regardless, the drive 812 may be utilized to store and retrieve software programs incorporating computer code that implements some or all aspects of the invention, data for use with the invention, and the like. Although CD-ROM 814 is shown as an exemplary computer readable storage medium, other computer readable storage media including floppy disk, tape, Flash or EEPROM memory, memory card, system memory, and hard drive may be utilized. Additionally, a data signal embodied in a carrier wave (e.g., in a network) may be the computer readable storage medium. In one implementation, a software program for the computer system 800 is provided in the system memory, the hard drive, the drive 812, the CD-ROM 814 or other computer readable storage medium and serves to incorporate the computer code that implements some or all aspects of the invention.

The various aspects, features, embodiments or implementations of the invention described above can be used alone or in various combinations.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different aspects, embodiments or implementations may, but need not, yield one or more of the following advantages. One advantage of the invention is that a user interface control can be more easily selected. Another advantage of the invention is that a user can be made aware of whether they are on a user interface control by responsiveness control.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computing system, comprising:
a display for presenting a graphical user interface;
a pointing device for a user to provide user input to manipulate a position indicator on the display; and
a positioning system configured to:
receive the user input via the pointing device, wherein a position change of the pointing device provides a corresponding change in the position indicator that is proportional to a selected scale factor of a plurality of scale factors, wherein a default scale factor corresponds to no frictional effect;
determine whether the position indicator is within a control region;
determine whether to apply a frictional effect corresponding to a first scale factor less than the default scale factor within the control region as a responsiveness effect to be applied to the position change of the pointing device when the position indicator is within the control region;
computationally apply the frictional effect as the first scale factor to the user input to determine a next position on the display for the position indicator when the determining determines to apply the frictional effect by:
receiving a first position change of the pointing device resulting from the user input;
calculating a modified position change by modifying the first position change based on the first scale factor to produce the frictional effect within the control region, the modified position change being less than the first position change; and
determining the next position of the position indicator using the modified position change such that the change in the position indicator is less than if the default scale factor was used; and
cause the position indicator to be displayed at the next position on the display.

2. A computing system as recited in claim 1, wherein the user input via the pointing device is received by the positioning system as movement data relative to a current position.

3. A computing system as recited in claim 2, wherein the responsiveness effect is applied when the current position is within a predetermined region corresponding to at least one user control of the graphical user interface.

4. A computing system, comprising:
a display for presenting a graphical user interface;
a pointing device for a user to provide user input to manipulate a position indicator on the display, wherein the user input is indicative of a first position on the display; and
a positioning system configured to:
receive the user input via the pointing device, wherein a position change of the pointing device provides a corresponding change in the position indicator that is proportional to a selected scale factor of a plurality of scale factors,
determine a responsiveness effect to be applied to the user input to determine a next position on the display for the position indicator, wherein a default scale factor corresponds to no responsiveness effect,
computationally apply the responsiveness effect to the user input to determine the next position by:
receiving a first position change of the pointing device resulting from the user input;

calculating a modified position change by modifying the first position change based on a first scale factor, the modified position change being less or more than the first position change; and determining the next position of the position indicator using the modified position change such that the change in the position indicator is less or more than if the default scale factor was used, and cause the position indicator to be displayed at the next position on the display, wherein the user input via the pointing device is received by the positioning system as movement data relative to a current position, wherein the responsiveness effect is applied when the current position is within a predetermined region corresponding to at least one user control of the graphical user interface.

5. A computing system as recited in claim 3, wherein the responsiveness effect is a frictional effect.

6. A computing system as recited in claim 5, wherein the predetermined region is defined by the at least one user control of the graphical user interface presented on the display.

7. A computing system as recited in claim 3, wherein the responsiveness effect is a frictional effect and the predetermined region is a friction area, and wherein said positioning system operates to impose a frictional effect with respect to movement of the position indicator on the display.

8. A computing system as recited in claim 7, wherein the friction area is defined by at least one user control associated with the graphical user interface presented on the display.

9. A computing system as recited in claim 3, wherein the responsiveness effect is a gravitational effect.

10. A computing system as recited in claim 4, wherein the predetermined region is a gravity area, and wherein the positioning system is further configured to impose a gravitational effect with respect to movement of the position indicator on the display.

11. A computing system as recited in claim 10, wherein the gravity area is defined by the at least one user control associated with the graphical user interface presented on the display.

12. A computing system, comprising a positioning system configured to:

receive user input data via a pointing device to manipulate a position indicator on a current position on a display, wherein a position change of the pointing device provides a corresponding change in the position indicator that is proportional to a selected scale factor of a plurality of scale factors, wherein a default scale factor corresponds to no gravity effect;

determine whether the current position is within a gravity area and moving towards or away from a central region of the gravity area;

receive a first position change of the pointing device resulting from the user input;

computationally increase the first position change data by modifying the first position change based on a first scale factor greater than the default scale factor, if it is determined that the current position is within the gravity area and moving towards the central region of the gravitational area;

computationally reduce the first position change data by modifying the first position change based on a second scale factor less than the default scale factor, if it is determined that the current position is within the gravity area and moving away from the central region of the gravity area; and use the increased or reduced position change to determine a next position for the position indicator on the display.

13. A computing system as recited in claim 10, wherein in imposing the gravitational effect, the positioning system is further configured to render the position indicator less sensitive to movement of the pointing device when it is determined that the current position is within the gravity area and moving away from a center area of the gravity area.

14. A computing system as recited in claim 10, wherein in imposing the gravitational effect, the positioning system is further configured to render the position indicator more sensitive to movement of the pointing device when it is determined that the current position is within the gravity area and moving towards from a center area of the gravity area.

15. A computing system as recited in claim 1, wherein the pointing device is a mouse, and wherein the computing system is a personal computer.

16. An apparatus supporting at least a display for visual output to a user and a pointing device for visual input by the user, the apparatus comprising:

a positioning system configured to;

receive the user input via the pointing device, wherein a position change of the pointing device provides a corresponding change in the position indicator that is proportional to a selected scale factor of a plurality of scale factors, wherein a default scale factor corresponds to no responsiveness effect;

determine whether the position indicator is within a control region; and cause a position indicator to be displayed at a next position for the pointing device in accordance with the user input, wherein the positioning system includes:

computer program code for determining, at least partially based on the position of the position indicator, a responsiveness effect to be applied using a scale factor in moving the position indicator in view of the user input when the position indicator is within the control region, such that the change in the position indicator is less or more than if the default scale factor was used; and computer program code for determining the next position for the position indicator at least partially based on the user input and the responsiveness effect.

17. An apparatus as recited in claim 16, wherein the responsiveness effect is one or more of a frictional effect and a gravitational effect.

18. A method implemented by a computing system, wherein the method comprises:

receiving user input via a pointing device operable to manipulate a position indicator on a display, wherein a position change of the pointing device provides a corresponding change in the position indicator that is proportional to a selected scale factor of a plurality of scale factors, wherein a default scale factor corresponds to no frictional effect;

determining whether the position indicator is within a control region;

determining whether to apply a frictional effect corresponding to a scale factor less than the default scale factor within the control region as a responsiveness effect to be applied to the position change of the pointing device when the position indicator is within the control region;

computationally applying the frictional effect as a first scale factor to the user input to determine a next position on the display for the position indicator when the determining determines to apply the frictional effect by:

receiving a first position change of the pointing device resulting from the user input;

calculating a modified position change by modifying the first position change based on the first scale factor to produce the frictional effect within the control region, the modified position change being less than the first position change; and determining the next position of the position indicator using the modified position change such that the change in the position indicator is less than if the default scale factor was used; and causing the position indicator to be displayed at the next position on the display.

19. A non-transient computer readable medium that includes executable computer code for positioning an indicator on a display, wherein the executable computer code includes:

executable computer code for receiving user input via a pointing device operable to manipulate a position indicator on a display, wherein a position change of the pointing device provides a corresponding change in the position indicator that is proportional to a selected scale factor of a plurality of scale factors, wherein a default scale factor corresponds to no frictional effect;

executable computer code for determining whether the position indicator is within a control region;

executable computer code for determining whether to apply a frictional effect corresponding to a scale factor less than the default scale factor within the control region as a responsiveness effect to be applied to the position change of the pointing device when the position indicator is within the control region;

executable computer code for computationally applying the frictional effect as a first scale factor to the user input to determine a next position on the display for the position indicator when the determining determines to apply the frictional effect by:

receiving a first position change of the pointing device resulting from the user input;

calculating a modified position change by modifying the first position change based on the first scale factor to produce the frictional effect within the control region, the modified position change being less than the first position change; and determining the next position of the position indicator using the modified position change such that the change in the position indicator is less than if the default scale factor was used; and executable computer code for causing the position indicator to be displayed at the next position on the display.

20. The computing system of claim 1, wherein the positioning system is further configured to:

determine whether to apply a gravitational effect corresponding to a second scale factor greater than the default scale factor within the control region as a responsiveness effect to be applied to the position change of the pointing device when the position indicator is within the control region; and computationally apply the gravitational effect by applying a second scale factor to the position change of the pointing device to determine a next position on the display for the position indicator when the determining determines to apply the gravitational effect.

21. The computing system of claim 1, wherein the selected scale factor is less when the position indicator is proximate an edge of the control region and relatively greater when the position indicator is proximate a center region of the control region such that the frictional effect decreases movement of the position indicator within the control region.

22. The apparatus of claim 16, wherein the selected scale factor at the center point of the control region is less or greater than a normal scale factor corresponding to when no responsiveness effect is to be applied.

* * * * *